United States Patent [19]

Perrault et al.

[11] Patent Number: 5,320,439
[45] Date of Patent: Jun. 14, 1994

[54] ARRANGEMENT FOR ATTACHING A DOWNCOMER OR THE LIKE

[76] Inventors: Frederick Perrault, 1727 Date Ave., Torrance, Calif. 90503; Raymond E. Perrault, 3845 Crest Rd., Rancho Palos Verdes, Calif. 90274

[21] Appl. No.: 17,462

[22] Filed: Feb. 12, 1993

[51] Int. Cl.$^5$ .............................................. F16L 3/00
[52] U.S. Cl. .................................... 403/379; 403/383; 403/377; 248/58; 248/62
[58] Field of Search .................... 248/58, 59, 62, 70; 403/245, 287, 383, 189, 379, 378, 377, 109; 411/171

[56] References Cited

U.S. PATENT DOCUMENTS 3,353,852 11/1967 Wood ................................... 403/379
4,270,063 5/1981 Dochterman ....................... 403/383

FOREIGN PATENT DOCUMENTS 813342 5/1937 France ................................. 403/245

Primary Examiner—Randolph A. Reese
Assistant Examiner—Anthony Knight
Attorney, Agent, or Firm—Richard F. Carr

[57] ABSTRACT

An arrangement is provided for attaching a downcomer which is in the form of a square tube to a weld stud of smaller dimension to provide a tight vibration free connection. Included is an adapter having an end wall and two opposed side walls defining a receptacle having one open end. The weld stud is received in the receptacle with apertures in the side walls of the adapter aligned with those of the stud. The open end of the square tube extends over the adapter with openings in the tube walls aligned with the openings in the adapter in the stud. The openings receive fasteners to make the attachment. One end of the adapter is slotted so that the adapter can be deflected and made to grip the stud frictionally during assembly.

15 Claims, 2 Drawing Sheets

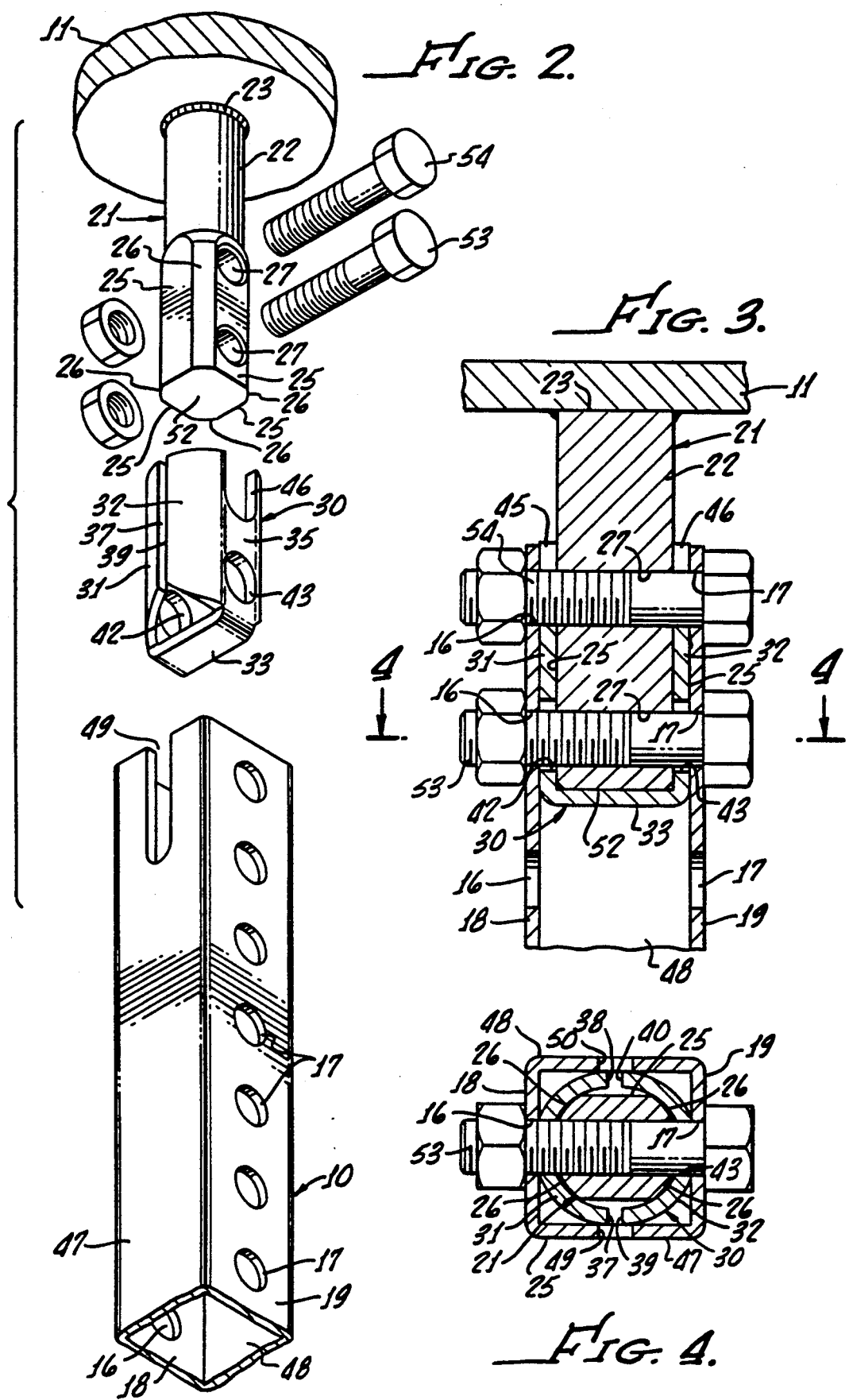

ARRANGEMENT FOR ATTACHING A DOWNCOMER OR THE LIKE

BACKGROUND OF THE INVENTION

In the construction of ships it is a common practice to attach a downcomer for supporting electrical hardware to a stud welded to a deck. A stud that has become used for this purpose includes one end that is adapted to be welded to the deck and an opposite end which has four flat surfaces interconnected by rounded corners. Two openings extend through the latter end of the stud interconnecting two opposite flat surfaces. The downcomer typically is a square tube with spaced openings extending the length of two opposite walls. Wireways are attached to the downcomer by fasteners that extend through these openings. One end of the downcomer can be extended over the end of the stud and attached to it by means of bolts that extend through openings in the downcomer and those in the end portion of the stud.

This makes a satisfactory attachment when the interior of the downcomer fits snugly over the weld stud. However, in some instances, because of the number of wireways that must be accommodated on the downcomer and the load that they must carry, it is necessary to use a square tube of a larger size which has an internal transverse dimension greater than the transverse dimension of the stud. In that event, the tight connection cannot be made and vibration between the stud and downcomer cannot be prevented. This results in objectionable noise. Also the connection may not be as secure as that where a tight fit can be obtained. This type of connection is not acceptable. Therefore, there has existed a need for a suitable means for connecting downcomers of larger dimension to weld studs of smaller dimension.

SUMMARY OF THE INVENTION

The present invention provides an arrangement by which larger downcomers may be attached to a standard weld stud to provide a tight vibration-free connection. The arrangement of this invention is economical to produce and convenient to use. Installation is accomplished rapidly.

Included is an adapter which is an integral sheet metal member having an end wall and two opposed side walls. This defines a receptacle open at one end. The side walls have spaced parallel side edges. The central portions of the side walls are flat and spaced apart a distance corresponding to the distance between two opposite flat surfaces of a weld stud. The edge portions of the side walls are arcuate. Openings are provided through the central portions of the side walls to correspond in location to the openings in the weld stud. At the open end of the adapter, these openings are in the form of opposite slots extending inwardly of the side walls.

In use, the adapter is fitted over the end of the stud and then the downcomer is extended over the adapter after which the assembly is secured together by bolts. The end wall of the adapter engages the end of the stud, which aligns the openings in the adapter and stud. The adapter occupies the space between the interior of the square tube of the downcomer and the outside surface of the stud so that the connection is secure and vibration is avoided.

In some instances tolerances may result in a situation where the outside of the stud is of smaller dimension than the inside of the adapter. In that event, the adapter is crimped inwardly at the slotted open end so that it then can be forced over the stud and held by a friction fit. This facilitates assembly because there is no need to separately attempt to hold the adapter within the downcomer as the downcomer is positioned around the stud. Also, if tolerances cause the adapter to be slightly smaller than the outside dimension of the stud the adapter may be expanded at its slotted open end as the adapter is driven on to the stud so that again the adapter fits tightly on the stud where it is held by friction. Assembly is greatly facilitated by the frictional retention of the adapter.

The end of the downcomer tube also may be slotted to similarly permit contraction or expansion.

BRIEF DESCRIPTION OF THE DRAWINGS

FIG. 2 is an enlarged fragmentary exploded perspective view of the arrangement for attaching the downcomer to the weld stud;

FIG. 3 is an enlarged longitudinal sectional view showing the connection of the downcomer to the weld stud;

FIG. 4 is a transverse sectional view taken along line 4—4 of FIG. 3;

DETAILED DESCRIPTION OF THE INVENTION

Figure 1:
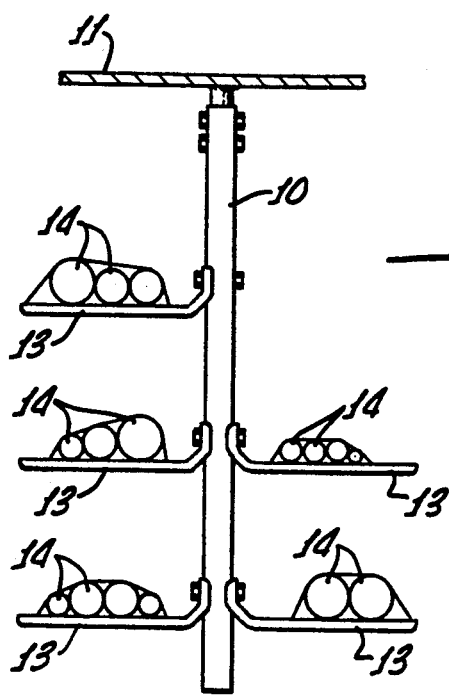
FIG. 1 is an elevational view of a downcomer attached to a deck and supporting wireways.

A downcomer 10, shown in FIG. 1, extends downwardly from a deck 11 of a ship and typically carries a number of wireways 13. Electrical cables 14 are supported by the wireways 13. The downcomer 10 is a square tube having spaced openings 16 and 17 in two opposite walls 18 and 19 (see FIG. 2). These openings receive bolts to attach the wireways 13 to the downcomer. Bolts through the openings 16 and 17 also are used in securing the downcomer 10 at the deck 11.

One arrangement for securing a downcomer to a deck is a commercially available weld stud 21, shown in FIG. 2. The upper part 22 of the stud 21 is in the form of a short rod, circular in cross-section. The end 23 of the section 22 is welded to the deck 11. At the opposite end, the stud includes flat sides 25, generally in a square pattern but interconnected by rounded corners 26. Two spaced openings 27 extend through this portion of the stud 21, interconnecting two opposite flat sides 25. The openings 27 match the openings 16 and 17 in the downcomer in diameter and spacing.

Some downcomers are of a size such that the flat sides 25 of a weld stud 21 fit snugly within the four walls of the downcomer and the two are secured together by two bolts extending through the matched openings 16, 17 and 27. In other instances, it is necessary to use a larger downcomer in order to provide adequate support for the cables which will be carried by the wireways. In that event, there will be clearance between the weld stud 21 and the walls of the downcomer. This permits vibration of the downcomer and is not acceptable.

The adapter 30, shown in FIGS. 2-6, enables the weld stud 21 to be used with larger downcomers 10.

The adapter 30 is a one-piece sheet metal member consisting of two opposite side walls 31 and 32 interconnected by a flat transverse bottom end wall 33. The side walls 31 and 32 are cylindrical segments except for flats 34 and 35 extending the lengths of the side walls at their centers. The longitudinal side edges 37 and 38 of the side wall 31 are respectively spaced opposite from, as well as being parallel to, the side edges 39 and 40 of side wall 32. Together the side walls 31 and 32 define a receptacle which is open at its upper end, as the device is illustrated, and bounded at the opposite end by the bottom wall 33.

Opposite openings 42 and 43 are provided through the flats 34 and 35 at the transverse centers of the side walls 31 and 32, respectively, above the bottom wall 33. These openings may be elongated longitudinally of the adapter 30 so as to have a somewhat oval shape.

Extending inwardly from the open upper end of the receptacle are two slots 45 and 46 formed in the flats 34 and 35 of the side walls 31 and 32, and aligned longitudinally with the openings 42 and 43.

The adapter is proportioned so that it will fit snugly within the four walls 18, 19, 47 and 48 of the downcomer 10. Preferably the downcomer 10 is provided with longitudinal slots 49 and 50 extending inwardly from one end of the downcomer in the walls 47 and 48.

In making the attachment between the downcomer 10 and the weld stud 21, the adapter 30 first is fitted over the lower portion of the weld stud. The adapter is advanced onto the weld stud 21 until its bottom wall 33 engages the bottom end 52 of the weld stud. In this location the two opposite openings 42 and 43 of the adapter 30 are aligned with the lowermost opening 27 through the weld stud, and the slots 45 and 46 are aligned with the other opening 27 in the weld stud. The flats 34 and 35 overlie two opposite flat walls 25 of the weld stud. The curved portions of the side walls 31 and 32 extend over the rounded corners 26 and are spaced outwardly from the other two flat walls 25 of the weld stud 21.

Figure 5:
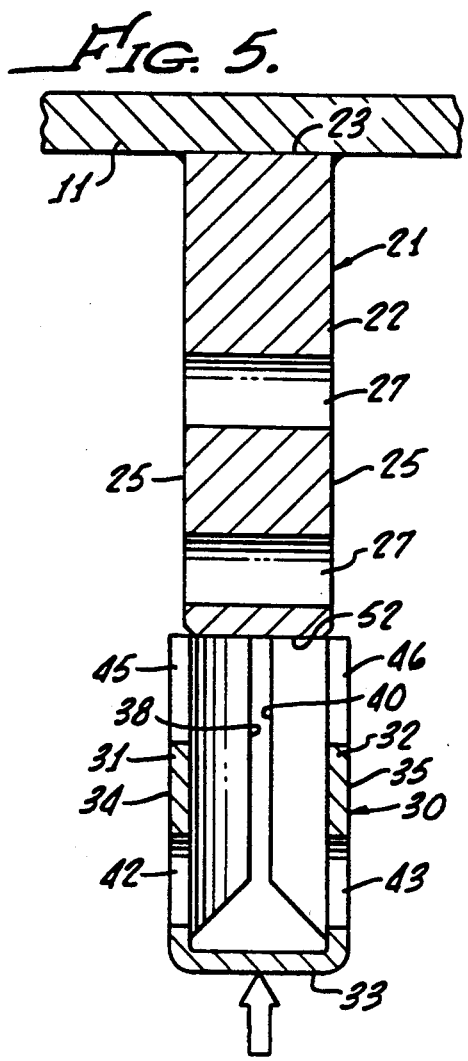
FIG. 5 is a longitudinal sectional view of the adapter and weld stud where the adapter is undersize.
Figure 6:
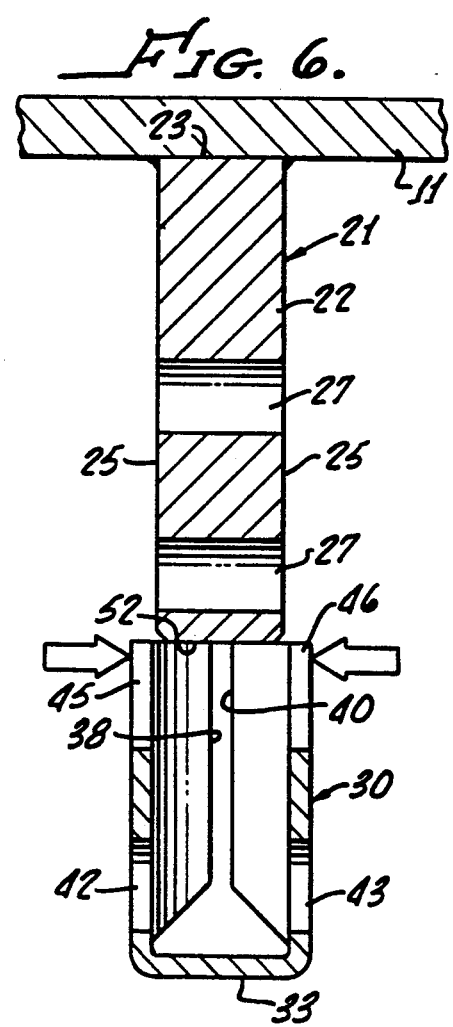
FIG. 6 is a view similar to FIG. 5, but with an oversize adapter.

If, as a result of tolerances, the interior of the adapter 30 is smaller transversely than the lower portion of the weld stud, the adapter may be tapped into place with a hammer and will spring apart slightly at the opposite edges 37 and 39, and 38 and 40 (FIG. 5). The adapter 30 then is held by friction on the stud 21, properly aligned as the bottom wall 33 of the adapter engages the end 52 of the stud (FIG. 5). On the other hand, if tolerances cause the adapter to be slightly oversized it can be crimped inwardly at its open end as permitted by the spaced edges 37 and 39, and 38 and 40, and by the slots 45 and 46 as well. This is illustrated in FIG. 6. The adapter 30 then can be tapped onto the stud 21 to be retained on the end of the weld stud 21 by friction, with the openings in the adapter being properly aligned with the openings in the weld stud.

The frictional retention of the adapter facilitates the installation as it is then merely necessary to extend the end of the downcomer over the adapter 30, bringing the endmost openings 16 and 17 into alignment with the slots 45 and 46 and the upper opening 27 through the weld stud 21. The next openings 16 and 17 of the downcomer then will align with the openings 42 and 43 of the adapter 30 and with the lowermost opening 27 of the weld stud 21. Bolts 53 and 54 then are extended through the aligned openings and complete the attachment. Without frictional retention of the adapter 30 on the weld stud 21, assembly would be difficult because the adapter would not stay in position as the downcomer 10 was moved over it.

With the use of the adapter 30, the downcomer is firmly held to the weld stud and no vibration will occur.

The slots 49 and 50 in the downcomer 10 provide another possible adjustment in the event that the outside of the adapter 30 is slightly larger than the interior of the square tube making up the downcomer. The slots 49 and 50 permit the end of the downcomer to be sprung open and forced over the adapter so that the installation is possible. If the adapter is slightly smaller than the interior dimension of the downcomer 10, the slots 49 and 50 allow contraction of the end of the downcomer to assure a tight connection. The slots 49 and 50 serve a similar purpose for downcomers of smaller transverse dimension which fit directly over the lower portion of the weld stud 21.

The foregoing detailed description is to be clearly understood as given by way of illustration and example only, the spirit and scope of this invention being limited solely by the appended claims.

What is claimed is:

1. In combination with a weld stud having a first end portion having at least one opening extending transversely therethrough and a second end portion adapted to be welded to a support, a downcomer arrangement comprising
    a square tube having an inside transverse dimension greater than the transverse dimension of said first end portion of said weld stud,
        said tube having aligned openings extending through two opposite walls thereof,
    an adapter comprising a one-piece sheet metal member having an end wall and two opposed side walls interconnected by said end wall,
        said side walls having oppositely positioned openings therethrough,
        said first end portion of said weld stud being substantially complementarily received between said side walls,
        said adapter being substantially complementarily received within said square tube,
        said aligned openings in said walls of said tube being aligned with said openings in said side walls of said adapter and said opening in said weld stud, and
    fastener means extending through said aligned openings, said oppositely positioned openings and said opening in said weld stud for attaching said square tube to said weld stud.

2. A device as recited in claim 1 in which the outer end surface of said first end portion of said weld stud engages said end wall of said adapter.

3. A device as recited in claim 1 in which said side walls frictionally grip said first end portion of said weld stud so as to hold said adapter on said first end portion of said weld stud independently of said fastener means.

4. A device as recited in claim 1 in which said side walls are deflectable for permitting said side walls to frictionally grip and receive said end portion of said weld stud therebetween, irrespective of dimensional variations between said side walls and said first end portion of said weld stud.

5. In combination with a weld stud having a first end portion having at least one opening extending transversely therethrough and a second end portion welded to a support, a downcomer arrangement comprising a square tube having an inside transverse dimension greater than the transverse dimension of said first end portion of said weld stud, said tube having a plurality of oppositely aligned spaced openings extending through two opposite walls thereof, an adapter comprising a one-piece sheet metal member having an end wall and two opposed side walls interconnected by said end wall, said side walls being contoured to define a receptacle open at one end, said side walls having longitudinal side edges which are spaced opposite from each other, and having oppositely positioned openings therethrough, said first end portion of said weld stud being substantially complementarily received within said receptacle.

said adapter being substantially complementarily received within said square tube, two opposite openings in said walls of said tube being aligned with said openings in said side walls of said adapter and said opening in said weld stud, and fastener means extending through said aligned openings for attaching said square tube to said weld stud.

6. A device as recited in claim 5 in which said openings in said side walls fall along the longitudinal centerlines of said side walls.

7. A device as recited in claim 5 in which said first end portion of said weld stud includes four flat surfaces interconnected by rounded corners, and said side walls of said adapter are substantially flat at the longitudinal center portions thereof so as to substantially complementarily overlie two of said flat surfaces of said weld stud, and said side walls are arcuate outwardly of said longitudinal center portions and overlie said rounded corners of said stud.

8. A device as recited in claim 5 in which said first end portion of said weld stud includes two spaced openings extending therethrough and in which said side walls include two sets of oppositely aligned openings therethrough, two of said oppositely aligned openings being slots extending inwardly from said open end of said receptacle, said slots being aligned with one of said openings in said weld stud and with two of said opposite openings in said walls of said square tube, and in which said fastener means includes a fastener extending through said slots and through an opening in said weld stud and openings in said square tube.

9. A device as recited in claim 8 in which said side walls of said adapter are bendable for permitting expansion and contraction of said receptacle so that said adapter can be made to fit snugly on said weld stud and be retained thereon by friction during assembly.

10. A device as recited in claim 5 in which the other two opposite side walls of said square tube include slots extending inwardly from one end of said square tube for permitting said one end of said square tube to be deflected so as to fit snugly on said adapter.

11. The method of securing a square tube to a weld stud having one end portion which is of lesser transverse dimension than the interior transverse dimension of said square tube comprising the steps of forming aligned openings through two opposite walls of said square tube, providing at least one opening through said one end portion of said weld stud, forming an adapter from sheet metal such that said adapter includes an end wall interconnecting two opposed side walls forming oppositely aligned opening means through said side walls, positioning said adapter over said one end portion of said weld stud so that said side walls of said adapter overlie said one end portion of said weld stud and said opening means of said adapter are aligned with said opening in said weld stud, deflecting said side walls of said adapter so that said side walls frictionally grip said one end portion of said weld stud and retain said adapter thereon, then positioning one end portion of said square tube over said adapter so that said openings in said walls of square tube are aligned with said opening means in said adapter and with said opening in said one end portion of said weld stud, and extending fasteners through said aligned openings and opening means for thereby attaching said square tube to said weld stud.

12. The method as recited in claim 11 in which for said opening means slots are provided in said side walls extending inwardly from the ends of said side walls remote from said end wall, and said side walls are deflected adjacent said slots to so frictionally grip said one end portion of said weld stud and retain said adapter thereon.

13. The method as recited in claim 11 in which said one end portion of said weld stud has four flat sides interconnected by rounded corners, and each of said side walls is provided with a flat surface and an arcuate surface on either side of said flat surface, said flat surface of said adapter being positioned over two of said flat sides of said one end portion, and said arcuate surfaces being positioned over said rounded corners of said one end portion.

14. The method of securing a square tube to a weld stud having one end portion which is of lesser transverse dimension than the interior transverse dimension of said square tube comprising the steps of forming a plurality of sets of spaced aligned openings through two opposite walls of said square tube, providing two longitudinally spaced openings through said one end portion of said weld stud, forming an adapter from sheet metal such that said adapter includes an end wall interconnecting two opposed side walls which define a receptacle having an open end, forming two spaced opening means through each of said side walls so that said opening means of said side walls are in oppositely aligned pairs, positioning said adapter over said one end portion of said weld stud so that said opening means of said adapter are aligned with said openings in said weld stud, and so that said side walls of said adapter engage said one portion of said stud and said adapter is frictionally retained thereon, then positioning one end portion of said square tube over said adapter so that two of said openings in said walls of square tube are aligned with said opening means in said adapter and with said openings in said one end portion of said weld stud, and extending fasteners through said aligned openings and opening means for thereby attaching said square tube to said weld stud.

15. The method as recited in claim 14 in which for said opening means apertures are provided through said side walls adjacent said end wall, and slots are provided in said side walls extending inwardly from said open end of said receptacle, and said side walls are deflected adjacent said slots so as to grip said one end portion of said weld stud and retain said adapter on said weld by friction prior to so extending said square tube over said adapter.

* * * * *